April 4, 1939.   J. R. HACKMAN   2,152,689
VIBRATION DEVICE
Filed Sept. 4, 1936   2 Sheets-Sheet 1
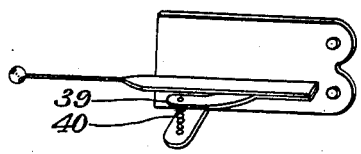
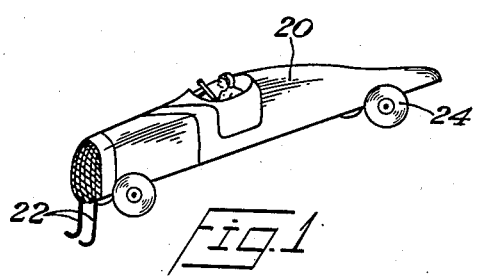
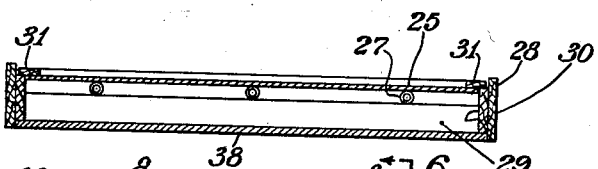
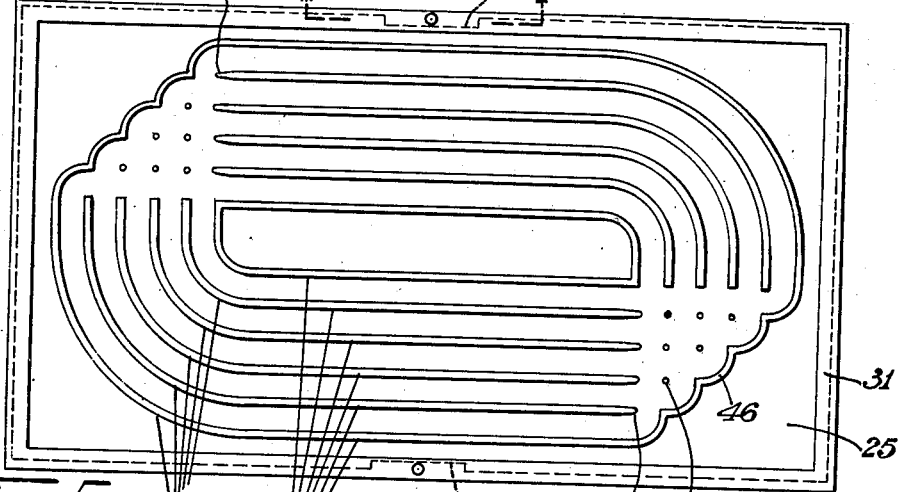
James R. Hackman   INVENTOR
BY
Mark H. Clayton ATTORNEY April 4, 1939.   J. R. HACKMAN   2,152,689
VIBRATION DEVICE
Filed Sept. 4, 1936   2 Sheets-Sheet 2
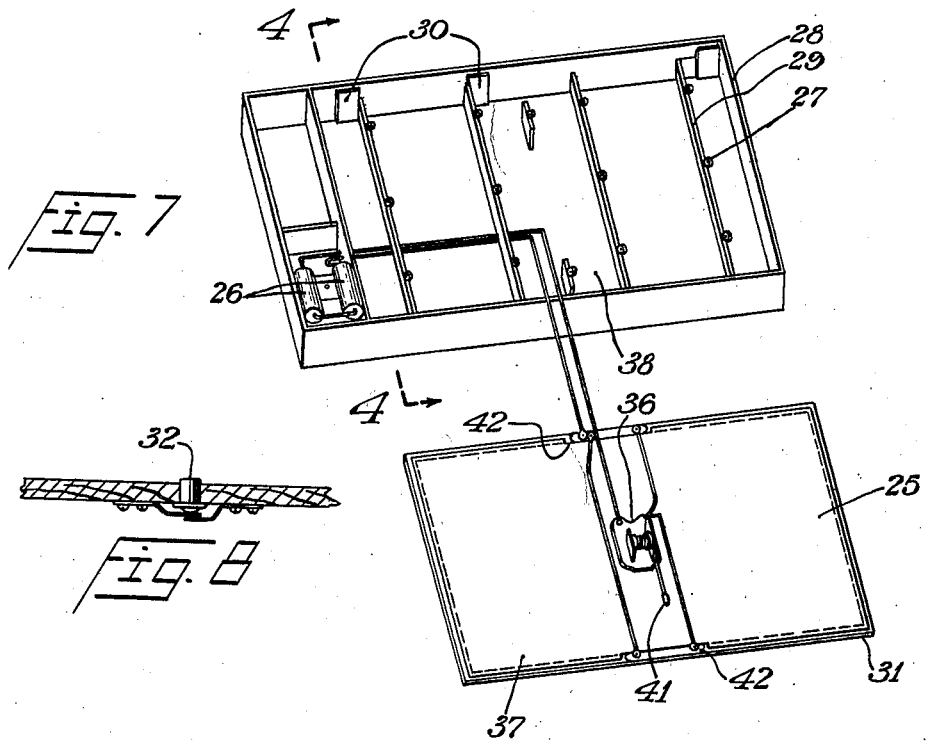
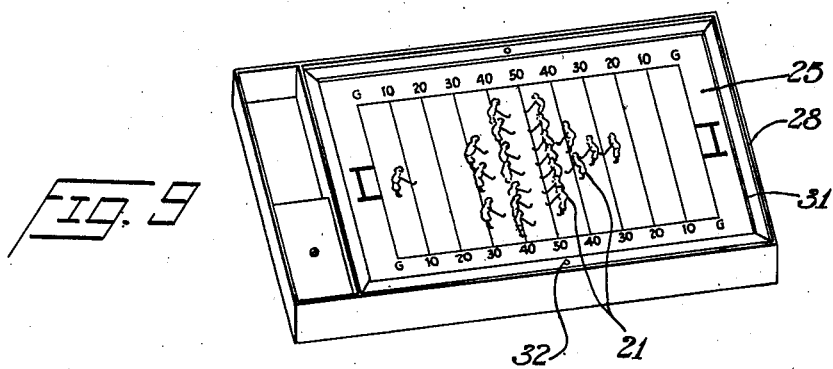
James R. Hackman INVENTOR
BY
Mark H. Clayton   ATTORNEY Patented Apr. 4, 1939

2,152,689

UNITED STATES PATENT OFFICE 2,152,689

VIBRATION DEVICE

James Richard Hackman, Wilmington, Del.

Application September 4, 1936, Serial No. 99,381

6 Claims. (Cl. 46—115)

This invention relates to devices in which objects are caused to move on a horizontal plane. More particularly it relates to games, toys, etc., of the type in which small models of men, boats and the like are caused to move about on a horizontal plane.

It is an object of this invention to provide objects which are capable of being moved about on the surface of a horizontal plane. It is a further object to provide means for moving such objects about on the surface of the plane. A still further object is to provide a device comprising in combination a horizontal plane, objects which are capable of being moved about on the surface of the plane, and means for moving the objects about. Another object is to provide such a device in which the objects have no physical contact with the means for moving them except through the horizontal plane. Still another object is to provide a game or toy involving motion of objects upon a horizontal plane, in which the means for causing the motion do not have physical contact with the objects which are moved except through the horizontal plane. Other objects will appear hereinafter.

These objects are accomplished by providing (a) parts, such as models of men, boats, horses, automobiles, etc. which are so constructed that when placed in normal relation to a plane, the back supports of the parts are, for example, the feet of the men, or the hind feet of the horse or the rear wheels of the auto, and which rest on one or more flexible supports, such as pieces of piano wire and (b) horizontal planes and (c) means for vibrating said planes. When these parts ( i. e., the models of men, etc.) are placed in normal relation to the plane, as described, and the plane is vibrated, the parts move generally in a forward direction. Thus, by placing models of men in a position facing each other they can be caused to move toward each other by vibrating the plane or by placing models of automobiles beside each other pointing in the same direction they can both be caused to move forward in the same direction by vibrating the plane.

The invention is illustrated by the accompanying drawings which include several specific embodiments of the invention. In these drawings Figure 1 is a view in perspective of an auto model suitable for use in the present invention.

Figure 2 is a view in perspective of a model of a football player suitable for use in the present invention.

Figure 3 is a view in perspective of a preferred type of a D. C. buzzer contact.

Figure 4 is a cross section showing an arrangement for supporting the plane and rim.

Figure 5 is a plan view of a rim in place on a plane provided with tracks arranged to direct small models in such a way that each will travel the same distance in completing a circuit around the center of the plane.

Figure 6 is a section of the plane and rim shown in Figure 5 on the line 6—6.

Figure 7 is a view in perspective of assembly for use in the present invention showing the plane removed and laid face down.

Figure 8 is a fragmentary section on the line 8—8 in Figure 5 showing the arrangement of a control button.

Figure 9 is a view in perspective of a complete embodiment of the invention showing the models in position on the board for the start of a football game.

As stated above the present invention provides parts adapted to move about on a horizontal plane. Two such figures are illustrated in Figs. 1 and 2, and are respectively an auto model 20 and a model of a football player 21. Each of these figures is provided with one or more parts 22, which are relatively flexible and upon which the figure rests in part when in normal position. Piano wire has been found to be a suitable material from which to construct these parts 22 but it will be understood that other similar flexible materials may be used. It has been found preferable, to construct the parts 22 from single strands of wire but this particular construction is not essential to the invention. Thus the parts 22 may be constructed not only from various flexible materials but in addition they may be made in the form of bands, etc., instead of single strands.

Where the figure is rather heavy it is generally advisable to supply it with two supports 22, as illustrated particularly in Fig. 1. Preferably also the supports will be constructed with curved ends 23 where they rest on the plane and will be relatively long and perpendicular where the nature of the model admits of it. Lengthening the supports appears to increase the speed with which they move. It also appears that perpendicular supports give more rapid motion than slanting supports do. Supports 22 may be secured to the parts 20 or 21 or their equivalents in any desired way. No particular means for securing them are essential.

The parts, such as 20 and 21, which are to be moved about on the inclined plane are preferably models of men, boats, horses, etc., but they may be of any desired form provided they are adapted to be rested in part upon supports such as parts 22. Moreover, the parts, such as 20 and 21, may be constructed of any desired material, such as a plastic, wood, metal, etc. The type of material from which these parts are to be constructed forms no part of this invention. Obviously the objects illustrated in Figs. 1 and 2 should be so constructed that mere vibration of the plane upon which they are to be moved will not cause any one of them to fall over each time the vibration is applied although it is not contemplated that they will be so constructed that they will not be knocked over or fall over occasionally. Thus the speed resulting from the use of perpendicular supports must sometimes be sacrificed as in part 21 to greater stability.

Models such as that illustrated in Fig. 1 are preferably provided with movable rear wheels 24. These greatly facilitate the movement of the models of autos, boats, etc.

For the purposes of this invention the plane upon which the parts, such as 20 and 21, are to be moved need possess only three characteristics. It must be substantially flat, it must be substantially level and it must be provided with means for vibrating it.

The plane should thus have a straight surface as contrasted with a curved surface and should not have any appreciable dips in it. In other words it should have one side which for practical purposes fits the word "plane". Strict geometrical accuracy is, of course, unnecessary but on the other hand it will be appreciated that a surface such as that possessed by a badly warped board would not be suitable. Nothing herein stated is intended to mean, however, that the upper surface cannot be provided with runways or the like in which the parts 20 and the like are to move and which direct their motion in a definite path.

Further, the plane should be substantially level as contrasted with one possessing a slope of 45 degrees from the horizontal. It is only necessary that it be "substantially" level, however. With regard to this property also it is not necessary that the plane be adjusted with a spirit level. If it is reasonably level, as observed merely by the human eye, it is satisfactory. Recollection of the purpose for which the plane is to be used will render obvious the extent to which the slope of the plane may vary from exact horizontal and will at the same time call to mind the reason why wide variation from the horizontal is not possible.

The third necessary feature of the plane is that it be provided with means for vibrating it. The nature of the vibration does affect the rate at which the parts, such as 20 and 21, move upon the surface of the plane but on the other hand it appears that some motion of these parts will be produced by any vibration of the plane sufficiently rapid to cause the supports of the parts to break contact with the surface of the plane. Similarly any means which will produce such vibration is apparently suitable for use in the device described herein.

It is thought that vibration of the plane in a vertical direction produces the motion of the parts, such as 20 and 21, but the invention is not intended to be limited to this theory. As a matter of fact, it is practically impossible to provide an assembly in which a plane is so vibrated that its motion is exclusively horizontal. Some vertical motion always accompanies any fairly rapid horizontal vibration in any arrangement of plane and vibrating means which has been tested and thus precludes any proof as to the exact nature of the effective vibration. On the other hand this fact makes it possible to accomplish the objects of this invention by vibrating the plane in any desired way provided the vibration is sufficiently rapid as pointed out above.

Any material which is capable of being converted into a plane as described above having a flat surface, not materially deformed by the weight of the parts, such as 20 and 21, upon it and which is sufficiently rigid throughout to transmit vibrations supplied at one point to other points and throughout the plane is a suitable material from which to construct the plane. The plane obviously may be of any desired length and width but is preferably relatively thin. Thin plywood, cardboard and the like have been found to be very good materials from which to construct the planes used in relatively small embodiments of the invention.

No special means for producing the vibration of the plane are required. That means selected should be adapted to produce fairly rapid vibration. Sharp vibration tends to cause the parts, such as 20 and 21, to move more rapidly than does less violent vibration but unfortunately it also increases the tendency of the moveable parts to fall over. Thus parts which have little tendency to fall over may be subjected to sharper vibrations than can others.

Excellent results have been obtained with ordinary dry cell buzzers, especially where the vibrating arm has been weighted. Moreover, the vibrating means may be attached directly to the plane or may be attached to a support for the plane. A suitable support is described in some detail hereinafter but it should be understood that any support which keeps the plane substantially level and permits it to be vibrated is suitable.

Although the vibrating means may vary widely in type and thus include those driven by mechanical power as well as electrical power, it has been found that electrically operated vibrators are preferable. Electrically operated vibrators are not only stopped and started quite readily but in addition their intensity is easily controlled. A wide variety of arrangements involving one or more points of control as well as various types of control, such as rheostats, push-buttons, etc., will be apparent to those skilled in the art. Further variation may be produced by the use of a plurality of vibrators on a single plane.

Preferably, of course, the support for the plane will be constructed so as to intensify rather than damp the vibrations. Thus planes supported on rubber or other resilient material vibrate better than those resting on more solid supports.

By way of illustration an assembly involving the principles described above and including a plane, vibrating means and a support for the plane is shown in the accompanying drawings and particularly in Figs. 4, 7, and 9. It will be noted especially by reference to Fig. 9 that the assembly is arranged in a box, into one part of which the plane 25 is placed and which is also provided with a space at the end for batteries 26. The box illustrated in these drawings is about 17 inches wide, about 33 inches long and about 2.5 inches deep, the battery compartment extending the full width and occupying about 3 inches of the length. The plane 25 is placed in the other 30 inch compartment.

It should not be gathered, however, that these dimensions or even this arrangement are to be construed as limitations upon the invention. To the contrary they merely represent a suitable embodiment. They as well as other dimensions given hereinafter may vary relative to one another as well as absolutely although they are given to indicate a construction which has operated satisfactorily.

The plane 25 is merely rested on the rubber supports 27 as shown in Fig. 4 and is neither attached to them nor to the box 28, although it may be attached to the box, if such construction is desired. The supports 27 for the plane are ¼ inch pieces of ¼ inch rubber tubing glued or otherwise fastened at suitable intervals along the upper edges of thin pieces of wood 29 resting edgewise on the bottom of the box 28 to which they may be either nailed or glued or otherwise attached and extending across its width, all as shown particularly in Figs. 4 and 7.

Small pieces of plywood 30 about ⅜ of an inch thick are affixed to the sides of the box inside of the plane compartment at intervals as shown in Fig. 7 so that their upper edges are about ⅜ of an inch below and parallel with the upper edge of the box. The pieces 30 provide support for a detachable rim 31 and it will be obvious that they may be replaced by a ledge or other similar support. The rim 31, shown, is made of thin plywood as are the box 28, the wood parts 29 and the pieces 30. This rim 31 is about ⅝ of an inch wide and is so constructed as to just fit snugly within the top of the box 28 and rest on pieces 30.

The plane 25, has a width slightly less than the distance across the box between the two inner edges of pieces 30 and is also slightly shorter than the inside length of the plane compartment of the box 28 between the two ends of that compartment. Parts 27 and 29 are so constructed and placed that the level of the top of parts 27 is such that when plane 25 is rested on them its upper face is slightly below the level of the upper edge of parts 30. Thus when the rim 31 is placed in position resting on parts 30 it does not press upon plane 25 and leaves room for it to vibrate. Rim 31, however, extends slightly over the edge of plane 25 and superficially holds it in position. Also plane 25 being of only slightly smaller dimensions than are necessary to fit it into place is not rigidly held but at the same time is restricted in its horizontal motion by the ends of the plane compartment and the pieces 30. Rim 31, being detachable, is readily removed to permit substitution of one plane for another. It will be noted as shown by the heavy lines marked 42 in Fig. 7 and by the dotted lines marked 43 in Fig. 5 that recesses are provided in plane 25 to allow space for push buttons 32 to operate.

As shown in Fig. 9 the rim 31 is supplied with push buttons 32 placed about at the center of each long side of the rim. The arrangement of one of the push buttons 32 is shown in detail in Fig. 8. Batteries 26, which are placed in the battery compartment at one end of the box and which may be fixed in place in any desired way, are connected on one side directly to the buzzer 36 and on the other side in parallel through the push buttons 32 to the other pole of the buzzer, all as particularly shown in Fig. 7.

The buzzer 36, an ordinary doorbell with the gong removed and the vibrating arm weighted, vibrates the plane and may be attached, for example by glue to either the bottom 38 of the box 28 or to the under side 37 of the plane 25, as shown in Fig. 7. As has been pointed out above the plane 25 may be made out of any of a wide variety of materials but is preferably made of fairly heavy cardboard or rather thin plywood. If the buzzer 36 is one which operates on ordinary dry cells delivering current having an E. M. F. of about 3 volts it is preferably attached to the under side of plane 25 but if on the other hand it is of a heavier type operating on ordinary house current, about 110-120 volts then it is preferably fastened to the bottom 38 of the box.

In order to eliminate a certain amount of noise it is preferable to provide the direct current buzzers with spring contacts at the point where the circuit is broken. A suitable set of contacts is shown in perspective in Fig. 3. Contact 39 which is a thin strip of metal is that usually employed in buzzers or doorbells and is attached to the vibrating arm of the buzzer. Contact 40 is a light coiled metal spring which replaces the rigid contact point ordinarily used. The use of such contacts as these is preferable to eliminate noise in the operation of the buzzer as far as it is possible to do so. If an alternating current is used a good installation involves mounting an electromagnet on the bottom of the box and close enough to an iron plate attached to the bottom of the plane to permit the magnet to attract the iron plate or the whole plane may be made of iron or steel, for example.

By weighting the buzzer vibrating arm, a more effective buzzer is obtained. The added weight 41 has been found to increase the intensity of the vibration and thus the rate of motion of the parts, such as 20 and 21.

The marking on the plane 25 shown in Fig. 9 requires little explanation. It is a reproduction of the layout of a football field. The plane 25 illustrated in Figs. 5 and 6, however, is a special type intended to be used where it is desired to race parts 20, around a circular track. The particular construction not only keeps each part 20 in its own lane but in addition involves such an arrangement of the lanes that each part 20 in making a circuit of the board travels exactly the same distance. The plane 25 is shown in these figures with the rim 31 in place upon it.

It is provided with parts 44 which are thin strips of wood glued or otherwise fastened to the upper surface of the plane to provide the lanes in which the parts 20 are to move. On the board shown these strips 44 on the end and the sides are about ⅛ of an inch high so that their top edge is slightly above the bottoms of the front wheels of the auto models intended to be used on this particular plane. Similarly thin curved strips 45 formed, for example, into quarter circles are provided at alternate corners but these are about ¼ of an inch high so that they extend above the axles of the front wheels of the auto models, for example. The higher strips on the curves are preferable to prevent the models from jumping out of their lanes.

A different arrangement is provided at the other two corners. At these corners the ends 48 of parts 44 are tapered off and parts 46 and pegs 47 are so placed that the parts 20 change lanes as they pass these corners. Thus the models on the extreme inner and the extreme outer lanes change lanes, those on the second inner and second outer lanes exchange and the model in the middle lane continues therein.

Parts 46 are merely thin strips like parts 45 and of the same height but constructed as shown in Fig. 5, each of the six points lying at an intersection of a projection of the lines in which parts 44 are laid on the ends and sides. As shown the curves in parts 46 are quarter circles but this exact construction is not essential. Parts 47 are pegs about 1/16 of an inch in diameter and about 1/4 of an inch high also set in the plane at intersections of projections of the lines on which parts 44 are set on the ends and sides. The parts 20 are thus kept in line by pegs 47 and turned by parts 46 into their new lanes. It is, of course, necessary that the width of the lanes be kept in proportion to width of the models to be used and also that the models be sufficiently short to permit them to make the turns at the corner.

Possible variations of the device described above as to size, shape, materials from which the parts are made, etc. are far too numerous to mention herein. They will be readily apparent from the above description, however. The materials specified in connection with the embodiment shown in the drawings may all be replaced by their known equivalents. In the above description the principle of the present invention (namely the production of motion in a predetermined direction on the horizontal surface of a plane of suitably constructed parts by vibrating the plane, the direction of the motion being determined largely by the placement of the parts and not by chance) has been applied to the construction of devices for amusement. It is not intended that this invention shall be limited to that particular application of the principle but instead that it shall include all devices, for whatever purpose they be intended, if they involve the principle outlined above.

Devices are known in which objects are moved on a flat plane by vibration of the plane but so far as applicant is aware, no objects have heretofore been provided which are so constructed that they move in a direction determined largely if not entirely by the way in which they are placed on the plane. That the discovery of the principle disclosed herein makes it possible to provide among other things novel amusement devices is apparent from the above description.

It is obvious that many widely different embodiments of this invention may be made without departing from the spirit and scope thereof and therefore it is not intended to be limited except as indicated in the appended claims.

I claim:

1. As a new article of manufacture, an object adapted to be set upon a flat surface and moved thereon by vibrating said flat surface, which said object has at least one support which is thin and relatively flexible and which said object has at least one other support which is relatively inflexible.

2. As a new article of manufacture, an object adapted to be set upon a flat surface and moved thereon by vibrating said flat surface, which said object has at least one support consisting of a strand of thin relatively springy material and which said object has at least one other support which is relatively inflexible.

3. As a new article of manufacture, an object adapted to be set upon a flat surface and moved thereon by vibrating said flat surface, which said object has sufficient supports to hold it upright when placed on the said flat surface, at least one of said supports being relatively rigid and at least one of said supports being formed of a springy material.

4. A new article of manufacture as described in claim 3, further characterized in that the springy support is relatively long.

5. A new article of manufacture as described in claim 3, further characterized in that the springy support on the object is formed from piano wire and in that the springy support is relatively long.

6. A new article of manufacture as described in claim 2, further characterized in that the object is a model of a man, boat, vehicle, animal or the like and in that the springy support is relatively long.

JAMES RICHARD HACKMAN.